United States Patent [19]
Martin et al.

[11] Patent Number: 5,912,034
[45] Date of Patent: Jun. 15, 1999

[54] PROCESS FOR INHIBITING ENZYMATIC BROWNING AND MAINTAINING TEXTURAL QUALITY OF FRESH PEELED POTATOES

[75] Inventors: Stefan T. Martin, Fort Washington; Gerald M. Sapers, Warrington; Robert L. Miller, Blue Bell, all of Pa.

[73] Assignees: EPL Technologies, Inc., Philadelphia, Pa.; The United States of America as represented by the Secretary of Agriculture, Washington, D.C.

[21] Appl. No.: 08/935,222

[22] Filed: Sep. 22, 1997

[51] Int. Cl.⁶ ........................................ A23L 1/277
[52] U.S. Cl. .................... 426/268; 426/254; 426/255; 426/271; 426/637; 426/654
[58] Field of Search ................................. 426/268, 637, 426/654, 520, 254, 255, 271

[56] References Cited

U.S. PATENT DOCUMENTS 5,447,734  9/1995  Street ........................................ 426/268

FOREIGN PATENT DOCUMENTS 355064752  5/1980  Japan .
404158738  6/1992  Japan .

*Primary Examiner*—Helen Pratt
*Attorney, Agent, or Firm*—Clifford W. Browning; Woodard, Emhardt, Naughton Moriarty & McNett

[57] ABSTRACT

A process is disclosed for inhibiting enzymatic browning in raw, peeled potatoes comprising dipping the potatoes in a solution of heated organic acids (45–65° C.), followed by treatment in a weakly basic solution to neutralize the potato surface and treatment with reducing agents, followed by storage in modified atmosphere packaging. The process may comprise two stages, in which sodium erythorbate in solution (approximate pH 7.8) is used both as the neutralizing agent and the reducing agent. Alternatively, the process may comprise three stages, in which a solution of the salt of an organic acid (such as sodium citrate) is used to neutralize the potato surface following the heated acid dip, and a third stage containing the reducing agents sodium erythorbate and erythorbic acid are combined at a final pH of greater than 4.3. Chelating agents or sequestrants may be added to the solutions. The process tends to delay the onset of enzymatic browning and, once browning has begun, limits the extent of enzymatic browning. The novel process causes little or no hardening or separation of the potato surface tissue in the final cooked product, and is potentially an alternative to the present use of sulfites for raw, peeled potatoes.

22 Claims, No Drawings

PROCESS FOR INHIBITING ENZYMATIC BROWNING AND MAINTAINING TEXTURAL QUALITY OF FRESH PEELED POTATOES

The present invention relates to the preservation of raw, peeled potatoes. In particular, the present invention relates to the use of a solution of heated organic acids (45–65° C.), followed by treatment in a weakly basic solution to neutralize the potato surface and treatment with reducing agents, and storage in modified atmosphere packaging, all to control enzymatic browning in raw peeled potatoes without induction of unacceptable textural qualities in the final cooked product. The process may comprise two stages in which sodium erythorbate in solution (approximate pH 7.8) is used in the second stage as both the neutralizing agent and the reducing agent. Alternatively, the process may comprise three stages in which a solution of the salt of an organic acid (such as sodium citrate) is used to neutralize the potato surface following the heated acid dip, and a third stage containing the reducing agents sodium erythorbate and erythorbic acid are combined at a final pH of greater than 4.3.

BACKGROUND OF THE INVENTION

Injury of most raw fruits and vegetables by methods of post-harvest minimal processing, such as peeling, cutting, slicing, crushing, etc., results in wound response by the injured tissue, including enzymatic browning. Enzymatic browning results from the polyphenol oxidase-catalyzed oxidation of phenolic compounds to ortho-quinones, which sequentially polymerize to form dark-colored pigments. Cellular disruption caused by minimal processing allows the interaction of polyphenol oxidase and phenolic compounds, which are compartmentalized in normal, intact cells.

Heretofore, most commercial efforts to control enzymatic browning in raw, minimally processed fruits and vegetables have involved the use of sulfite treatments. However, sulfites have been implicated as the cause of allergic reactions in certain sensitive individuals, resulting in anaphylactic shock and death in rare cases. (Taylor, S. L., N. A. Higley, and R. K. Bush, 1986, Sulfites in foods: uses, analytical methods, residues, fate, exposure assessment, metabolism, toxicity, and hypersensitivity. Adv. Food Res. 30: 1–76.)

Virtually all sulfite alternatives for the prevention of enzymatic browning in raw, peeled potatoes that have been patented or reported in the literature involve the use of acidic solutions with a pH lower than 3. Such treatments generally involve the use of organic acids such as citric and/or malic acid in combination with ascorbic or erythorbic acid. The pH of these dips is much lower than the optimum pH for polyphenol oxidase activity. Adjuncts such as thiol compounds (e.g. L-cysteine) may be added to acidic solutions to improve their efficacy against browning.

Unfortunately, most of these treatments do not provide adequate shelf life, and low-pH solutions tend to induce "case hardening," which is a surface firming observable in the cooked product, resulting in what is often described as "raw-like" lumps when the potatoes are mashed. The case-hardened layer often separates from the rest of the potato tissue during cooking.

Sapers and Miller found that pre-treatment of peeled potatoes in heated organic acid solutions greatly improved the efficacy of conventional, organic acid-based browning inhibitor dips. (Sapers, G. M., and R. L. Miller, 1995, Heated ascorbic/citric acid solution as browning inhibitor for pre-peeled potatoes. J. Food Sci. 60 (4): 762–766 & 776.) However, this treatment induced even more textural deficiencies in the final, cooked product than did the acidic browning inhibitor dips, alone.

It is thought that acidic dips induce case hardening by mobilizing and redistributing divalent cations from the potato cell interiors. (Sapers, G. M., P. H. Cooke, R. L. Miller, A. E. Heidel, and S. T. Martin, Structural changes related to textural deficiencies of pre-peeled potatoes. Presented at the 1996 IFT Annual Meeting, New Orleans, La., June 26.) The cations cross-link partially de-methylated pectin molecules in the cell walls and middle lamella, which renders the tissue more resistant to thermal degradation. Heating could increase this effect by activation of endogenous pectin methylesterase, resulting in further de-esterification of the pectin and the creation of more binding sites for the calcium or magnesium. (Bartolome, L. G., and J. E. Hoff, 1972, Firming of potatoes: biochemical effects of pre-heating.) Heating may also increase hardening by promoting greater diffusion of the acids into the potato tissue.

There is currently a need for a method of treatment for fresh, peeled potatoes that provides adequate protection from enzymatic browning without the use of sulfites, and which limits textural deficiencies in the product following cooking.

SUMMARY OF THE INVENTION

The present invention provides a novel method for the treatment of fresh, peeled potatoes. This method provides superior protection from enzymatic browning without inducing unacceptable textural deficiencies in the final, cooked product.

It has been discovered that a heated acid dip followed with a neutralizing dip greatly improves the textural properties of the final, cooked product over the process of Sapers and Miller supra. The present invention provides a useful, novel process for the treatment of raw, peeled potatoes to improve their storage stability without inducing unacceptable textural deficiencies in the final, cooked product.

The present invention utilizes two or three successive aqueous solutions. The first solution contains citric acid, alone, or in combination with ascorbic acid (or its enantiomer, erythorbic acid) at less than pH 2.5, heated to 45–65° C. Treatment in the heated organic acid solution is followed by treatment in a weakly basic solution to neutralize the potato surface and treatment with reducing agents, and storage in modified atmosphere packaging. The process of the present invention may comprise just two stages, one of which utilizes sodium erythorbate in solution (approximate pH 7.8) as both the neutralizing agent and the reducing agent. Alternatively, the process may comprise three stages, in which a solution of the salt of an organic acid (such as sodium citrate) is used to neutralize the potato surface (second stage) following the heated acid dip (first stage), and a third stage containing the reducing agents sodium erythorbate and erythorbic acid, which are combined at a final pH of greater than 4.3. Sodium ascorbate and ascorbic acid may be substituted for their stereoisomers (enantiomers), sodium erythorbate and erythorbic acid, respectively, in the solutions.

Chelating agents such as EDTA or sodium acid pyrophosphate may be added to the solutions to sequester copper ions, which are the co-factor of polyphenoloxidase, the enzyme involved in the enzymatic browning reaction. Such chelating agents may also be used to inhibit "after-cooking darkening," a non-enzymatic oxidation reaction requiring the presence of divalent iron ions which is noticeable in some potato cultivars following cooking. (Feinberg, B., R. L. Olson, and W. R. Mullins, 1987, Prepeeled potatoes. In "Potato Processing," 4$^{th}$ ed., ed. W. F. Talburt and O. Smith, pp. 697–726. A VI-Van Nostrand Reinhold, N.Y.)

DETAILED DESCRIPTION OF THE INVENTION

The present invention requires treatment of the potatoes in the heated organic acid dip to be followed by treatment in a weakly basic solution to neutralize the potato surface and treatment with reducing agents, and then storage in modified atmosphere packaging.

The processes of the present invention utilize successive aqueous treatment solutions. The first solution is comprised of a combination of citric acid and ascorbic acid, or citric acid alone, at a total concentration of at least 2%, heated to 45–65° C. For optimum results, a combination of 2% citric acid and 1% ascorbic acid, or 3% citric acid alone, should be used. Potatoes may be dipped in said solution for 3 to 10 minutes. It is believed that dipping fresh, peeled potatoes in such a heated solution of organic acids lowers polyphenol oxidase activity in surface tissue by partially denaturing the enzyme. It is also believed that the heated, acidic solution facilitates some removal of polyphenol oxidase and browning substrates on the surface of the peeled potato by leaching.

The second solution comprises the salt of an organic acid (such as sodium citrate at a minimum concentration of 2%) to neutralize the potato surface (minimum dip time 2 minutes) following the heated acid dip. The use of a weakly basic solution following treatment in the heated solution of organic acids is thought to inhibit induction of case hardening by neutralizing the potato surface.

The third solution comprises the reducing agents sodium erythorbate and erythorbic acid (minimum dip time 2 minutes), combined at a final pH of 4.3 or greater. Sodium erythorbate, a reducing agent, inhibits enzymatic browning by reducing ortho-quinones, the products of polyphenol oxidase-catalyzed oxidation of activity, back to ortho-diphenols. Sodium ascorbate and ascorbic acid may be substituted for their stereoisomers (enantiomers), sodium erythorbate and erythorbic acid, respectively, in said solutions.

The treatment processes may comprise just two treatment solution stages when sodium erythorbate in solution (minimum 2% concentration, approximate pH 7.8) is used both as the neutralizing agent and the reducing agent. Potatoes must be dipped in said sodium erythorbate solution for a minimum of 2 minutes.

The pH of the final dip of the two-stage process is almost 8, which is close to the optimal pH for polyphenol oxidase-catalyzed oxidation of tyrosine (pH 8.2 in potato homogenate) (Matheis, G. 1987. Chem. Mikrobiol. Technol. Lebensm. 11: 5.), which is the main browning substrate in potatoes. (Muneta, P., 1981, Comparisons of inhibitors of tyrosine oxidation in the enzymatic blackening of potatoes. Am. Potato J. 58: 85–92.)

Our findings suggest that the three-stage process may be slightly more effective than the two-stage process in inhibiting enzymatic browning, probably because the pH of the final dip of the three-stage process can be adjusted to as low as pH 4.3 without adversely affecting cooked product texture.

Chelating agents such as EDTA or sodium acid pyrophosphate may be added to the solutions to further inhibit enzymatic browning by sequestration of copper ions. Polyphenoloxidase requires copper ions as a co-factor in order to have enzymatic activity.

Such chelating agents may also be used to inhibit "after-cooking" darkening, the iron-catalyzed oxidation of chlorogenic acid leading to the formation of gray pigments, by sequestering iron. These chelating agents are acidic, however, and therefore the pH of the sodium erythorbate solution should be adjusted to approximately pH 8 with concentrated sodium hydroxide.

The use of modified atmosphere packaging (MAP) is necessary to obtain maximum shelf life. MAP is considered to be the second-most important factor (behind temperature) in determining shelf life of minimally processed fruits and vegetables. A polymeric film should be selected that results in steady-state equilibrium levels of headspace oxygen and carbon dioxide which are effective in reducing the respiration rate of the potatoes without inducing anaerobiosis. The films selected for the examples presented herein met these requirements.

The following examples are provided herein to illustrate the preferred embodiments of the present invention.

EXAMPLE ONE

Maris Piper potatoes were purchased from a supermarket. Potatoes were abrasion-peeled in a carborundum peeler (Imperial Machine Co., Ltd., Model VK14T) for 90 seconds, then held under water until treatment. Potatoes were dipped 5 minutes at 55° C. in one of the following Stage One solutions:

1—water
2—0% citric acid, 0.5% ascorbic acid
3—0% citric acid, 1.0% ascorbic acid
4—1.0% citric acid, 0% ascorbic acid
5—1.0% citric acid, 0.5% ascorbic acid
6—1.0% citric acid, 1.0% ascorbic acid
7—2.0% citric acid, 0% ascorbic acid
8—2.0% citric acid, 0.5% ascorbic acid
9—2.0% citric acid, 1.0% ascorbic acid
10—3.0% citric acid, 0% ascorbic acid
11—3.0% citric acid, 0.5% ascorbic acid
12—3.0% citric acid, 1.0% ascorbic acid
13—5.0% citric acid
14—3.0% acetic acid
15—3.0% lactic acid Potatoes were drained and rinsed/cooled in running tap water for 15 seconds. Potatoes were then dipped for 5 minutes in Stage Two, 3% sodium erythorbate. Two controls were prepared, one which was treated with Stage Two only (Treatment #16), and one which was untreated (Treatment #17). Potatoes were packed, 3 per bag (250 g), in Respire™ 369 film bags (Oxygen Transmission Rate (OTR)=300 cc/100 in$^2$/24 hrs, EPL Technologies, Inc., Philadelphia, Pa.), and stored at 3° C.±1° C. All treatments and controls were performed in triplicate.

TABLE 1

Discoloration of Potato Samples During Storage
(each number represents the mean subjective measurement of
discoloration of three replicate samples)

| Treatment | Day 2 Mean Rating* | Day 5 Mean Rating | Day 7 Mean Rating | Day 10 Mean Rating | Day 14 Mean Rating |
|---|---|---|---|---|---|
| #1 | 5.0 | 5.0 | 5.0 | 5.0 | 5.0 |
| #2 | 4.0 | 4.0 | 4.0 | 4.0 | 4.0 |
| #3 | 2.0 | 4.0 | 4.5 | 4.5 | 4.5 |
| #4 | 1.0 | 1.5 | 2.5 | 2.5 | 2.5 |
| #5 | 1.0 | 1.5 | 2.5 | 3.5 | 3.5 |
| #6 | 2.0 | 2.0 | 3.5 | 3.5 | 3.5 |
| #7 | 1.0 | 1.0 | 1.5 | 2.0 | 2.5 |
| #8 | 2.0 | 3.0 | 3.5 | 3.5 | 3.5 |
| #9 | 1.0 | 1.0 | 1.0 | 1.5 | 1.5 |
| #10 | 1.0 | 1.0 | 1.0 | 1.5 | 1.5 |
| #11 | 2.0 | 2.5 | 2.5 | 3.0 | 3.5 |
| #12 | 1.0 | 3.5 | 4.5 | 4.5 | 5.0 |
| #13 | 1.0 | 1.0 | 1.5 | 1.5 | 3.5 |
| #14 | 3.5 | 5.0 | 5.0 | 5.0 | 5.0 |
| #15 | 1.0 | 3.0 | 4.0 | 4.0 | 5.0 |
| #16 | 5.0 | 5.0 | 5.0 | 5.0 | 5.0 |
| #17 | 5.0 | 5.0 | 5.0 | 5.0 | 5.0 |

*Ratings were based on the overall acceptability of each sample as a whole. For example, if one of the three potatoes in a particular sample exhibited severe discoloration, the entire sample was rated as 5.0, even if the other two potatoes in the sample exhibited no discoloration.
Rating scale:
1 = acceptable, little or no discoloration (like fresh)
2 = still acceptable, but not as good as fresh
3 = marginal
4 = marginal-unacceptable
5 = unacceptable Treatment with water only in Stage 1 (Treatment #1) was no more effective than omission of Stage 1 (Treatment #16) and no treatment at all (Treatment #17). By Day 2, all samples from these three treatments were rated unacceptable (5.0). Addition of various combinations of organic acids to Stage 1 was more effective in inhibiting discoloration than using water only in Stage 1. The most effective treatments were Treatments #9 (2% citric acid, 1% ascorbic acid in Stage 1) and #10 (3% citric acid in Stage 1). All three samples of each of these two treatments were still acceptable by Day 10. All other combinations of citric and ascorbic acid were less effective. Two other organic acids, acetic and lactic, were tried in Stage 1 (Treatments #14 and #15, respectively). Both were more effective than Treatment #1 (Water only), but were less effective than Treatments #9 and #10.

EXAMPLE TWO

Maris Piper potatoes were purchased from a supermarket. Potatoes were abrasion-peeled in a carborundum peeler (Imperial Machine Co., Ltd., Model VK14T) for 90 seconds, held under water until treatment. Potatoes were dipped 5minute at 55° C. in 2% citric acid, 1% ascorbic acid, rinsed 15 seconds in running tap water, then dipped 5 minutes in either 0%, 1%, 2%, 3% or 4% sodium erythorbate (16° C.±2° C.) . Untreated controls were also prepared. Four replicates of each treatment and the control were prepared. Potatoes were drained and packaged in Respire™ P369 film bags (OTR=300 cc/100 in²/24 hrs, EPL Technologies, Inc., Philadelphia, Pa.), one pound per bag (4 potatoes). Potatoes were stored at 3° C.±1° C. Samples were evaluated at various intervals. At the end of the experiment (Day 16), samples were evaluated for headspace gas concentrations, then opened and evaluated for spoilage odors and surface moisture.

TABLE 2

Discoloration of Potato Samples During Storage (each
number represents the mean subjective measurement of
discoloration of four replicate samples)

| Treatment | Day 1 Mean Rating* | Day 3 Mean Rating | Day 5 Mean Rating | Day 7 Mean Rating | Day 9 Mean Rating | Day 11 Mean Rating | Day 14 Mean Rating |
|---|---|---|---|---|---|---|---|
| Untreated Control | 4.0 | 5.0 | 5.0 | 5.0 | 5.0 | 5.0 | 5.0 |
| 0% NaE** | 1.0 | 1.5 | 1.5 | 1.5 | 2.5 | 3.0 | 3.5 |
| 1% NaE | 1.5 | 2.0 | 2.0 | 2.5 | 3.5 | 4.0 | 4.0 |
| 2% NaE | 1.0 | 1.0 | 1.0 | 1.0 | 1.5 | 1.5 | 1.5 |
| 3% NaE | 1.0 | 1.0 | 1.0 | 1.0 | 1.0 | 1.0 | 1.0 |
| 4% NaE | 1.0 | 1.0 | 1.0 | 1.0 | 1.0 | 1.5 | 1.5 |

*Ratings were based on the overall acceptability of each sample as a whole. For example, if one of the three potatoes in a particular sample exhibited severe discoloration, the entire sample was rated as 5.0, even if the other two potatoes in the sample exhibited no discoloration.
Rating scale:
1 = acceptable, little or no discoloration (like fresh)
2 = still acceptable, but not as good as fresh
3 = marginal
4 = marginal-unacceptable
5 = unacceptable

TABLE 3

Day 16 Headspace Gas Concentrations and Evaluation
of Sample Odor and Surface Moisture

| Treatment | % $O_2$ | % $CO_2$ | Odor | Surface |
|---|---|---|---|---|
| Control | 1.7 ± 0.4 | 3.5 ± 0.2 | good | dry |
| 0% NaE | 4.2 ± 0.2 | 3.2 ± 0.1 | good | moist |
| 1% NaE | 3.5 ± 0.6 | 3.2 ± 0.2 | good | moist |
| 2% NaE | 4.5 ± 0.6 | 2.8 ± 0.1 | good | moist |
| 3% NaE | 4.0 ± 0.2 | 2.7 ± 0.1 | good | moist |
| 4% NaE | 3.8 ± 0.2 | 2.8 ± 0.1 | good | moist |

A minimum of 2% sodium erythorbate was required to obtain greater than 10 days of acceptable quality (Table 2). Most samples treated with 2–4% sodium erythorbate had an acceptability rating of 1.0 until Day 14. A few of these packages were rated slightly lower, but were still acceptable. These samples were generally downgraded from a 1.0 due to minor discoloration in only one of the 4 potatoes within the sample.

Samples treated with 0% or 1% sodium erythorbate generally began to exhibit minor discoloration within 5 to 7 days, and most were marginal or unacceptable by Day 11.

All samples, including controls, had an acceptable odor by the end of the experiment, Day 16 (Table 3). Treated samples had approximately 4% headspace oxygen at the end of the experiment. However, the control samples had less headspace oxygen (1.7%±0.4%), concentrations of less than 2% are considered potentially hazardous. The difference between headspace oxygen concentrations in the treated and the control samples may have been due to the fact that the treatments seemed to retain integrity of the cut surface tissue, while the surface tissue of the controls appeared to be damaged due to excessive drying. A higher degree of tissue damage would be expected to increase the rate of respiration, resulting in lower headspace oxygen concentrations.

EXAMPLE THREE

Kennebec potatoes were purchased from a major distributor and stored at 4° C. in the dark. Potatoes were scrubbed lightly in tap water, sanitized 1 minute in 100 ppm $Cl_2$ (adjusted to pH 6.5 with citric acid), and rinsed briefly. Potatoes were abrasion-peeled 75 seconds in a carborundum peeler (Toledo Vegetable Peeler, Model A1-15, Toledo Scale Co., Toledo, Ohio). Potatoes were held in a holding solution of 2% sodium acid pyrophosphate (SAPP), 0.25% NaCl. Holding solution was thoroughly rinsed off prior to treatment. Potatoes were treated in one of the following ways (4 replicates per treatment):

Commercial Browning Inhibitor (CBI)

Commercial Browning Inhibitor (CBI) (72% citric acid, 14.4% ascorbic acid, 7.6% sodium acid pyrophosphate, and 6% L-cysteine) dip, used in accordance with manufacturer's instructions, 5 minute dip in a 3% solution (pH 2.3).

Heated Acid (5 minute)-rinse-Neutralization 5 minute dip at 55° C. in a 3% solution (pH 2.3) of the aforementioned Commercial Browning Inhibitor (CBI) (source of citric and ascorbic acids) plus 0.05% EDTA, rinsed 15 seconds in running tap water, 5 minute dip in 3% sodium erythorbate.

Heated Acid (7.5 minute)-rinse-Neutralization 7.5 minute dip at 55° C. in a 3% solution (pH 2.3) of the aforementioned Commercial Browning Inhibitor (CBI) plus 0.05% EDTA, rinsed 15 seconds in running tap water, 5 minute dip in 3% sodium erythorbate.

Heated Acid (7.5 minute)-rinse-Neutralization (w/ SAPP)

7.5 minute dip at 55° C. in 3% solution (pH 2.3) of the aforementioned Commercial Browning Inhibitor (CBI) plus 0.05% EDTA, rinsed 15 seconds in running tap water, 5 minute dip in 3% sodium erythorbate, 0.5% SAPP (adjusted to pH 7.8 with 50% NaOH (w/w)).

Potatoes were drained and packed (2–3 per bag) in Respirem 50 film bags (OTR=300 cc/100 $in^2$/24 hrs, EPL Technologies, Inc., Philadelphia, Pa.). Bags were stored at 4° C.

TABLE 4

Discoloration of Potato Samples During Storage
(each number represents the mean subjective measurement of discoloration of four replicate samples)

| Treatment | Day 0 Mean Rating* | Day 4 Mean Rating | Day 8 Mean Rating | Day 11 Mean Rating | Day 15 Mean Rating |
|---|---|---|---|---|---|
| Commercial Browning Inhibitor | 1.0 | 2.0 | 2.5 | 5.0 | 5.0 |
| Heated Acid (5 min)-rinse-Neutralization | 1.0 | 1.5 | 1.5 | 1.5 | 3.0 |
| Heated Acid (7.5 min)-rinse-Neutralization | 1.0 | 1.0 | 1.0 | 1.5 | 2.5 |
| Heated Acid (7.5 min)-rinse-Neuturalization (w/SAPP) | 1.0 | 1.5 | 1.5 | 1.5 | 2.0 |

*Ratings were based on the overall acceptability of each sample as a whole. For example, if one of the three potatoes in a particular sample exhibited severe discoloration, the entire sample was rated as a 5.0, even if the other two potatoes in the sample exhibited no discoloration.
Rating scale:
1 = acceptable, little or no discoloration (like fresh)
2 = still acceptable, but not as good as fresh
3 = marginal
4 = marginal-unacceptable
5 = unacceptable All Heated Acid-Neutralization treatments performed better than the Commercial Browning Inhibitor (CBI) dip. The CBI samples became unacceptable within 8–11 days. Only one sample from the three Heated Acid-Neutralization treatments was acceptable by Day 15. There appeared to be a slight benefit with the longer digestion time towards the end of the experiment. The addition of SAPP to the sodium erythorbate dip (as a sequestrant of $Fe^{2+}$ to prevent after-cooking darkening) did not adversely affect browning inhibition. In fact, samples treated by the Heated Acid-Neutralization process with added SAPP appeared to be slightly better in overall appearance than samples from the other two Heated Acid-Neutralization treatments. This observation is generally consistent with results obtained in other trials to date.

EXAMPLE FOUR

Round-white potatoes were purchased from a local distributor the day before the experiment and stored at 20° C. in the dark, overnight. Potatoes were scrubbed lightly in tap water, sanitized 1 minute in 100 ppm $Cl_2$ (adjusted to pH 6.5 with citric acid), and rinsed briefly. Potatoes were abrasion-peeled 75 seconds in a carborundum peeler (Toledo Vegetable Peeler, Model A1-15, Toledo Scale Co., Toledo, Ohio). Potatoes were held in a holding solution of 2% sodium acid pyrophosphate (SAPP), 0.25% NaCl. Holding solution was thoroughly rinsed off prior to treatment. Potatoes were treated in one of the following ways, in duplicate:

Heated Acid-Neutralization (15 seconds)

5 minute dip at 55° C. in a 3% solution of the Commercial Browning Inhibitor (CBI) mentioned in Example Three (source of citric and ascorbic acids) plus 0.05% EDTA (pH 2.3), and 15 seconds in 4% sodium erythorbate.

Heated Acid-Neutralization (1 minute)

5 minute dip at 55° C. in a 3% solution of the aforementioned Commercial Browning Inhibitor (CBI) plus 0.05% EDTA (pH 2.3), and dipped 1 minute in 4% sodium erythorbate.

Heated Acid-Neutralization (3 minutes)

5 minute dip at 55° C. in a 3% solution of the aforementioned Commercial Browning Inhibitor (CBI) plus 0.05% EDTA (pH 2.3), and dipped 3 minutes in 4% sodium erythorbate.

Heated Acid (rinse)-Neutralization (3 minutes)

5 minute dip at 55° C. in a 3% solution of the aforementioned Commercial Browning Inhibitor (CBI) plus 0.05% EDTA (pH 2.3), rinsed 15 seconds in running water, and dipped 3 minutes in 4% sodium erythorbate.

Heated Acid-CBI 5 minute dip at 55° C. in 2% citric acid, 1% ascorbic acid, 0.05% EDTA, cooled 2 minutes in running water, and dipped 5 minutes in a 3% solution (pH 2.3) of the aforementioned Commercial Browning Inhibitor (CBI).

Potatoes were drained and packed (3 per bag) in Respire™ 50 film bags (OTR=300 cc/100 $in^2$/24 hrs, EPL Technologies, Inc., Philadelphia, Pa.). Samples were stored at 4° C. After 14 days of storage, 2 potatoes from each bag (potatoes which exhibited significant browning were not used) were quartered lengthwise and boiled in water with ½ teaspoon salt for 18 minutes. Quarters were drained and cooled several minutes. Firmness of the peeled surface of 6–8 quarters was tested using a penetrometer (McCormick Fruit Tester FT 011) with a ⅝" plunger. Quarters were mashed in a Kitchen Aid mixer (setting 3) for 30 seconds with 1 tablespoon butter. ⅛ cup milk was added, and potatoes were further mashed for 4 minutes. Mixer was stopped after 2 and 3 minutes of mixing to scrape sides of bowl. 100 grams mashed potatoes was vigorously stirred in 1 liter of water for 45 seconds and poured through a #8 sieve. This process was repeated two more times on material remaining on the sieve. After the third washing, lumps collected by sieve were measured.

TABLE 5

Discoloration of Potato Samples During Storage
(each number represents the mean subjective measurement of discoloration of two replicate samples)

| Treatment | Day 0 Mean Rating* | Day 5 Mean Rating | Day 7 Mean Rating | Day 11 Mean Rating | Day 14 Mean Rating |
|---|---|---|---|---|---|
| Heated Acid-Neutralization (15 seconds) | 1 | 1 | 3 | 3 | 3 |
| Heated Acid-Neutralization (1 minute) | 1 | 1 | 1 | 5 | 5 |
| Heated Acid-Neutralization (3 minutes) | 1 | 1 | 1 | 1 | 2 |
| Heated Acid (rinse)-Neutralization (3 minutes) | 1 | 1 | 1 | 1 | 1 |
| Heated Acid-CBI | 1 | 1 | 1 | 1 | 1 |

*Ratings were based on the overall acceptability of each sample as a whole. For example, if one of the three potatoes in a particular sample exhibited severe discoloration, the entire sample was rated as a 5.0, even if the other two potatoes in the sample exhibited no discoloration.
Rating scale:
1 = acceptable, little or no discoloration (like fresh)
2 = still acceptable, but not as good as fresh
3 = marginal
4 = marginal-unacceptable
5 = unacceptable

TABLE 6

Case Hardening After 14 Days of Storage at 4° C.

| Treatment | Cooking Time | Firmness of Cooked Surface (kg) | Size of Lumps from Mash |
|---|---|---|---|
| Heated Acid-Neutralization (3 minutes) | 27 min | 0.33 ± 0.14 | up to 5 mm |
| Heated Acid-Neutralization (3 minutes) | 21 min | 0.45 ± 0.12 | up to 5 mm |
| Heated Acid (rinse)-Neutralization (3 minutes) | 27 min | | up to 7 mm |
| Heated Acid (rinse)-Neutralization (3 minutes) | 21 min | 0.43 ± 0.07 | up to 5 mm |
| Heated Acid-CBI | 27 min | 0.58 ± 0.07 | up to 10-15 mm |
| Heated Acid-CBI | 21 min | 0.73 ± 0.14 | up to 10-15 mm |

Discoloration of the potatoes treated with the Heated Acid-neutrlization process was clearly greater in the treatments where time in the sodium erythorbate dip was 1 minute or less, as compared to those potatoes treated by this process but with a 3 minute sodium erythorbate dip (Table 5). Potatoes treated by the Heated Acid-Neutralization process with a 3 minute sodium erythorbate dip, and potatoes treated with the Heated Acid-CBI process, were acceptable through Day 14.

The Heated Acid-CBI process used in the present example is analagous to that reported by Sapers and Miller supra. The authors reported that this process was an effective inhibitor of enzymatic browning, but that case hardening in the final cooked product was evident. The data in Table 6 shows that potatoes treated by an analogous process had firmer surface tissue after cooking than potatoes treated by the Heated Acid-Neutralization process, especially when the cooking time was 21 minutes. Over-cooking the potatoes by increasing boiling time to 27 minutes substantially lowered surface tissue firmness of potatoes from both treatments, but surface tissue firmness of those treated with the Heated Acid-Neutralization process was still higher than in potatoes treated with the Heated Acid-Neutralization process and boiled for only 21 minutes. Additionally, size of the lumps in the mash made from potatoes treated with the Heated Acid-CBI process were about twice the size as with the potatoes treated with the Heated Acid Neutralization process, and lump size was not decreased by extending cooking time. These results show that while heating the potatoes in acid contributes to anti-browning efficacy, neutralization of the potato surface following this step is necessary to producing a product with acceptable texture.

EXAMPLE FIVE

Russet Burbank (80-count) potatoes were obtained from a local distributor. Potatoes were used on day of purchase. Potatoes were scrubbed lightly in tap water, sanitized 1 minute in 100 ppm $Cl_2$ (adjusted to pH 6.5 with citric acid), and rinsed briefly. Potatoes were abrasion-peeled 75 seconds in a carborundum peeler (Toledo Vegetable Peeler, Model A1-15, Toledo Scale Co., Toledo, Ohio). Potatoes were held in a holding solution of 2% sodium acid pyrophosphate (SAPP), 0.25% NaCl. Holding solution was thoroughly rinsed off prior to treatment. Potatoes were treated in one of the following ways, in triplicate:

3% CBI 5 minute dip in a 3% solution (pH 2.3) of the Commercial Browning Inhibitor (CBI) mentioned in Example Three.

5% CBI 5 minute dip in 5% solution of the aforementioned Commercial Browning Inhibitor (pH 2.1).

45/5 Heated Acid-CBI 5 minute dip at 45° C. in 2% citric acid, 1% ascorbic acid, 0.05% EDTA, cooled 2 minutes in running water, and dipped 5 minutes in a 3% solution of the aforementioned Commercial Browning Inhibitor (CBI) (pH 2.3).

55/5 Heated Acid-CBI 5 minute dip at 55° C. in 2% citric acid, 1% ascorbic acid, 0.05% EDTA, cooled 2 minutes in running water, and dipped 5 minutes in a 3% solution of the aforementioned Commercial Browning Inhibitor (CBI) (pH 2.3).

55/5 Heated Acid-Neutralization 5 minute dip at 55° C. in a 3% solution of the aforementioned Commercial Browning Inhibitor (CBI)(source of citric and ascorbic acids) plus 0.05% EDTA (pH 2.3), rinsed 15 seconds in running water, and dipped 5 minutes in 3% sodium erythorbate, 0.5% SAPP (adjusted to pH 8.0 with 50% NaOH (w/w)).

55/7.5 Heated Acid-Neutralization 7.5 minute dip at 55° C. in a 3% solution of the aforementioned Commercial Browning Inhibitor (CBI) plus 0.05% EDTA (pH 2.3), rinsed 15 seconds in running water, and dipped 5 minutes in 3% sodium erythorbate, 0.5% SAPP (adjusted to pH 8.0 with 50% NaOH (w/w)).

Potatoes were drained and packed (3 per bag) in Respires™ 50 film bags (OTR=300 cc/100 in$^2$/24 hrs, EPL Technologies, Inc., Philadelphia, Pa.)). Bags were stored at 4° C. for 1 week (visual evaluations were performed on Day 6). After 1 week of storage, 2 potatoes from each bag (potatoes which exhibited significant browning were not used) were quartered lengthwise and boiled in water with ½ teaspoon salt for 18 minutes. Quarters were drained and cooled several minutes. Firmness of the peeled surface of 6–8 quarters was tested using a penetrometer (McCormick Fruit Tester FT 011) with a ⅝" plunger. Quarters were mashed in a Kitchen Aid mixer (setting 3) for 30 seconds with 1 tablespoon butter. ⅛ cup milk was added, and potatoes were further mashed for 4 minutes. Mixer was stopped after 2 and 3 minutes of mixing to scrape sides of bowl. 100 grams mashed potatoes was vigorously stirred in 1 liter of water for 45 seconds and poured through a #8 sieve. This process was repeated two more times on material remaining on the sieve. After the third washing, lumps collected by sieve were weighed and measured.

TABLE 7

Discoloration of Potato Samples After 6 Days of Storage (each number represents the mean subective measurement of discoloration of three replicate samples)

| Treatment | Mean Visual Rating* |
| --- | --- |
| 3% CBI | 4.0 |
| 5% CBI | 2.5 |
| 45/5 Heated Acid-CBI | 2.0 |
| 55/5 Heated Acid-CBI | 2.5 |
| 55/5 Heated Acid-Neutralization | 2.0 |
| 55/7.5 Heated Acid-Neutralization | 1.0 |

*Ratings were based on the overall acceptability of each sample as a whole. For example, if one of the three potatoes in a particular sample exhibited severe discoloration, the entire sample was rated as a 5.0, even if the other two potatoes in the sample exhibited no discoloration.
Rating scale:
1 = acceptable, little or no discoloration (like fresh)
2 = still acceptable, but not as good as fresh
3 = marginal
4 = marginal-unacceptable
5 = unacceptable

TABLE 8

Case Hardening of Cooked Potatoes

| Treatment | Firmness of Cooked Surface (kg) | Percent of Lumps in Mash (by wt.) | Size of Lumps from Mash |
| --- | --- | --- | --- |
| 3% CBI | 0.68 ± 0.17 | 7.4 ± 4.7 | up to 4–6 mm |
| 5% CBI | 1.11 ± 0.20 | 13.2 ± 2.1 | up to 8–10 mm |
| 45/5 Heated Acid-CBI | 1.17 ± 0.25 | 17.3 ± 1.2 | up to 8–10 mm |
| 55/5 Heated Acid-CBI | 1.08 ± 0.23 | 17.0 ± 2.4 | up to >10 mm |
| 55/5 Heated Acid-Neutralization | 0.51 ± 0.09 | 3.1 ± 0.9 | up to 3–4 mm |
| 55/7.5 Heated Acid-Neutralization | 0.56 ± 0.11 | 2.3 ± 0.4 | up to 3–4 mm |
| Control | 0.52 ± 0.11 | 2.0 ± 1.2 | up to 3–4 mm |

The 3% Commercial Browning Inhibitor (CBI) treatment provided clearly less protection against browning than all other treatments. All samples from this treatment were rated as marginal or worse on Day 6. This result is consistent with results from previous experiments. The Heated Acid-Neutralization treatment with the longer digestion time provided the most protection in this experiment. Measurements of peeled surface hardening and total amount of case-hardened tissue in potatoes treated by the two Heated Acid-Neutralization treatments were similar to the control. A 3% solution of the CBI appeared to induce some case hardening. However, a 5% solution of the CBI and the two Heated Acid-CBI treatments induced by far the most amount of case hardening.

EXAMPLE SIX

Maris Piper potatoes were purchased from a supermarket. Potatoes were abrasion-peeled in a Carborundum peeler (Imperial Machine Co., Ltd., Model VK14T) for 2 minutes, then held under water. Potatoes were treated in one of the following ways (use of commercial products conformed to manufacturers' instructions):

Heated Acid-Neutralization Process

Dipped 5 minutes at 55° C. in 2% citric acid, 1% ascorbic acid, rinsed 15 seconds in running tap water, and dipped 5 minutes in 3% sodium erythorbate (pH 7.8).

Roche Pre-Mix 4380

Dipped 5 minutes in 3% Fruit and Vegetable Dip III, Pre-Mix 4380 (pH 2.2) (labelled as "salt, ascorbic acid, citric acid, and malic acid"; Roche Products Ltd., London, England).

SnowFresh®

Dipped 15 minutes in 3% SnowFresh® (pH 2.4) (labelled as "calcium chloride, SAPP, citric acid, and ascorbic acid"; covered by one or more of the following U.S. Pat. Nos.: 4,988,522 and 5,055,313; Monsanto Co., St. Louis, Mo.).

Hamulbac K

Dipped 3 minutes in 3% Hamulbac K (pH 2.3) (labelled as "organic acid, ascorbic acid, and inorganic salt"; G. C. Hahn and Co., Mold, Wales) for 3 minutes.

Control

Untreated.

Potatoes were drained and packed, 3 per bag,(210 g–230 g), in Respire™ 369 film bags (OTR=300 cc/100 in$^2$/24 hrs, EPL Technologies, Inc., Philadelphia, Pa.). Samples were stored at 3° C.±1° C. Three replicate samples from each treatment were removed on each of three days of observation (Day 4, Day 7, and Day 10) for analysis of headspace gas concentrations, off-odors, and color. Color was analyzed using a Handy-Color™ calorimeter (BYK-Gardner, Silver Spring, Md.). Ten points on each potato, 3 equidistant points around the bud end, 3 equidistant points around the stem end, and 4 equidistant points around the "equator," were analyzed using the color meter. L* values, which indicate relative whiteness, of the ten points were averaged to give an L* value score for each potato. The potato L* value scores were used to calculate the mean L* value and standard deviation for each treatment for a given day of analysis.

TABLE 9

L* Values (Whiteness) of Potatoes Treated With Various Commercial Browning Inhibitor Formulations, packaged in a semi-permeable film, and stored at 3° C. ± 1° C.

|  | Day 4 | Day 7 | Day 10 |
| --- | --- | --- | --- |
| Heated Acid-Neutralization Process (EPL) | 76.08 ± 0.84 | 74.12 ± 1.02 | 71.76 ± 3.26 |
| Pre-Mix 4380 (Roche) | 74.01 ± 2.08 | 71.61 ± 1.98 | 69.15 ± 3.06 |
| SnowFresh ® (Monsanto) | 73.06 ± 1.55 | 70.12 ± 2.79 | 69.53 ± 2.16 |
| Hamulbac K (Hahn) | 73.28 ± 1.05 | 71.92 ± 2.49 | 67.98 ± 2.40 |
| Untreated Control | 51.34 ± 5.42 | 52.05 ± 5.12 | 51.68 ± 4.88 |

TABLE 10

Headspace gas analysis of potatoes treated with various commercial browning inhibitor formulations, packaged in a semi-permeable film, and stored at 3° C. ± 1° C.

|  | Day 4 | | Day 7 | | Day 10 | |
| --- | --- | --- | --- | --- | --- | --- |
|  | % $O_2$ | % $CO_2$ | % $O_2$ | % $CO_2$ | % $O_2$ | % $CO_2$ |
| Heated Acid-Neutralization Process (EPL) | 5.5 ± 0.2 | 4.0 ± 0.3 | 6.1 ± 0.9 | 3.8 ± 0.1 | 5.5 ± 0.3 | 3.3 ± 0.3 |
| Pre-Mix 4380 (Roche) | 4.8 ± 1.1 | 4.5 ± 0.6 | 4.8 ± 1.3 | 4.1 ± 0.4 | 3.7 ± 0.9 | 3.9 ± 0.1 |
| SnowFresh ® (Monsanto) | 5.4 ± 0.6 | 4.4 ± 0.2 | 4.1 ± 0.4 | 4.0 ± 0.3 | 2.8 ± 0.2 | 3.7 ± 0.1 |
| Hamulbac K (Hahn) | 4.8 ± 0.7 | 4.9 ± 0.1 | 3.1 ± 0.3 | 4.9 ± 0.3 | 2.9 ± 0.1 | 4.0 ± 0.2 |
| Untreated Control | 3.9 ± 1.0 | 4.0 ± 0.2 | 3.1 ± 0.6 | 3.9 ± 0.2 | 2.8 ± 0.1 | 3.7 ± 0.2 |

All untreated control potatoes were severe black-brown within a day or two. L* values of the controls bottomed out at around 50 by Day 4 and remained at this level until the end of the experiment (Table 9).

All treatments showed a marked improvement over the control. Even the least effective treatments had mean L* values only slightly less than 70 by Day 10. Samples treated with the Heated Acid-Neutralization process had higher mean L* values than all other treatments on all days of observation. It should be noted that because the samples had to be destroyed following analysis, different replicate samples from each treatment were used on each day of analysis. Therefore, the data show that the Heated Acid-Neutralization process not only outperformed the other treatments consistently, but also over a large number of samples.

Headspace oxygen concentrations of the samples were generally in the range of 3 to 6% (Table 10). It is interesting to note that the headspace oxygen concentrations of the samples from the Heated Acid-Neutralization treatment were consistently higher than those of all other samples, and headspace oxygen concentrations of the controls were consistently among the lowest. These data indicate that one of the benefits of the Heated Acid-Neutralization process may be to reduce the respiration rate of the potatoes.

EXAMPLE SEVEN

Russet potatoes ("90's"—approximately 9 oz. each) were purchased from a local distributor on the day of the test, transported to the lab, and washed. Potatoes were abrasion-peeled in a carborundum peeler (Toledo Vegetable Peeler, Model A1-15, Toledo Scale Co., Toledo, Ohio) for 3 minutes, then held in water. 3 peeled potatoes per batch (300 g–330 g) were treated by one of the following methods (use of commercial products conformed to manufacturers' instructions):

Heated Acid-Neutralization Process

Dipped 5 minutes at 55° C. in 2% citric acid, 1% ascorbic acid, rinsed 15 seconds in running tap water, and dipped 5 minutes in 3% sodium erythorbate (pH 7.8).

Roche Pre-Mix 4380

Dipped 5 minutes in 3% Fruit and Vegetable Dip III, Pre-Mix 4380 (pH 2.2) (labelled as "salt, ascorbic acid, citric acid, and malic acid"; Roche Products Ltd., London, England).

SnowFresh®

Dipped 15 minutes in 3% SnowFresh® (pH 2.4) (labelled as "calcium chloride, SAPP, citric acid, and ascorbic acid"; covered by one or more of the following U.S. Pat. Nos.: 4,988,522 and 5,055,313; Monsanto Co., St. Louis, Mo.).

Hamulbac K

Dipped 3 minutes in 3% Hamulbac K (pH 2.3) (labelled as "organic acid, ascorbic acid, and inorganic salt"; G. C. Hahn and Co., Mold, Wales) for 3 minutes.

Potatoes drained and packed in Respire P369 film bags (OTR=300 cc/100 in$^2$/24 hrs, EPL Technologies, Inc., Philadelphia, Pa.), stored at 4° C. for two days. After the two-day storage period, potatoes from each bag were cut in half lengthwise and boiled in water for 20 minutes (untreated controls were prepared by peeling, as described above, immediately prior to cooking). Halves were drained and cooled 10 minutes. Firmness of the peeled surface of halves was tested using a penetrometer (McCormick Fruit Tester FT 011) with a ⅝" plunger. Halves were mashed in a Kitchen Aid mixer (setting 3) for 30 seconds with 1 tablespoon butter. ⅛ cup milk was added, and potatoes were further mashed for 4 minutes. Mixer was stopped after 2 and 3 minutes of mixing to scrape sides of bowl. 100 grams mashed potatoes was vigorously stirred in 1 liter of water for 1 minute and poured through a #8 sieve. This process was repeated two more times on material remaining on the sieve. After the third washing, lumps collected by sieve were weighed and measured. A "blind" taste test evaluation was performed to subjectively evaluate texture of mashed potatoes.

TABLE 11

Case Hardening of Cooked Potatoes

| | Pre-Mix 4380 (Roche) | SnowFresh ® (Monsanto) | Hamulbac K (Hahn) | Heated Acid-Neutralization | Control |
|---|---|---|---|---|---|
| Firmness of Cooked Surface (kg) | 0.57 ± 0.28 | 0.71 ± 0.21 | 0.71 ± 0.16 | 0.45 ± 0.18 | 0.34 ± 0.09 |
| Percent of Lumps in Mash (by wt.) | 7.5 ± 1.7 | 9.8 ± 1.0 | 9.2 ± 2.6 | 4.9 ± 1.8 | 1.5 ± 0.2 |
| Size of Lumps from Mash | up to 6 mm | up to 7–10 mm | up to 8–9 min | up to 5–6 mm | up to 4–6 mm |
| Appearance of Lumps from Mash | Thick (~1 m), opaque | Thick (~1 m), opaque | Thick (18 1 m), opaque | Thin, translucent | Very small |
| Mouth-feel of Mash | Small to medium-size lumps. Lumps slightly raw-like (crunchy). Noticeably different from control. | Small to medium-size lumps. Lumps slightly raw-like (crunchy). Noticeabiy different from control. | Small to medium-size lumps. Lumps siightly to moderately raw-like (crunchy) Noticeably different from control. | Very small lumps. Lumps not raw-like. Only slightly different from control. | Little or no lumps. |

The Hahn and SnowFresh dips appeared to induce the most case hardening. Potatoes treated with these two dips had the firmest surface tissue after cooking, and mashes from these treatments had the highest percentage of lumps by weight. The lumps in the mashes from these two treatments were larger than those from the other treatments.

The Roche dip appeared to induce less case hardening than the Hahn and SnowFresh® dips, but more than the Heated Acid-Neutralization treatment. Mashes from all three commercial dips contained thick, opaque lumps, which had a slightly crunchy, raw-like mouth-feel typical of case hardening (taste test was performed "blind"). Lumps in the mash prepared from potatoes treated with the Heated Acid-Neutralization process were fairly thin and translucent, and did not have a crunchy, raw-like mouth-feel. The mouth-feel of this mash was judged to be only slightly more lumpy than the Control, but substantially more acceptable than mashes prepared from potatoes treated with the commercial dips.

EXAMPLE EIGHT

Round-white potatoes were received from a potato processor. Potatoes had been stored long-term, initially at 2° C. with a gradual increase to 4° C. as the storage period progressed. Potatoes were stored at 8° C. for approximately one day prior to shipment. Upon receipt at the laboratory, potatoes were placed in storage at room temperature for approximately 24 hours.

Potatoes were abrasion-peeled 2 minutes in a course-grit carborundum peeler (Imperial Machine Co., Ltd., Model VK14T), then held under water. Potatoes were treated in one of the following ways:

2-stage (final pH 7.8)

Dipped 5 minutes at 55° C. in 2% citric acid, 1% ascorbic acid, rinsed 15 seconds, then dipped 5 minutes in 3% sodium erythorbate (pH 7.8).

3-stage (final pH 2.5)

Dipped 5 minutes at 55° C. in 2% citric acid, 1% ascorbic acid, rinsed 15 seconds, dipped 2.5 minutes in 3% sodium citrate, rinsed 15 seconds, then dipped 2.5 minutes in 3% ascorbic acid (pH 2.5).

3-stage (final pH 3.2)

Dipped 5 minutes at 55° C. in 2% citric acid, 1% ascorbic acid, rinsed 15 seconds, dipped 2.5 minutes in 3% sodium citrate, rinsed 15 seconds, then dipped 2.5 minutes in 2.5% ascorbic acid, 0.5% sodium erythorbate (pH 3.2).

3-stage (final pH 3.6)

Dipped 5 minutes at 55° C. in 2% citric acid, 1% ascorbic acid, rinsed 15 seconds, dipped 2.5 minutes in 3% sodium citrate, rinsed 15 seconds, then dipped 2.5 minutes in 2% ascorbic acid, 1.0% sodium erythorbate (pH 3.6).

3-stage (final pH 4.3)

Dipped 5 minutes at 55° C. in 2% citric acid, 1% ascorbic acid, rinsed 15 seconds, dipped 2.5 minutes in 3% sodium citrate, rinsed 15 seconds, then dipped 2.5 minutes in 1% ascorbic acid, 2% sodium erythorbate (pH 4.3).

3-stage (final pH 7.8)

Dipped 5 minutes at 55° C. in 2% citric acid, 1% ascorbic acid, rinsed 15 seconds, dipped 2.5 minutes in 3% sodium citrate, rinsed 15 seconds, then dipped 2.5 minutes in 3% sodium erythorbate (pH 7.8).

Potatoes were drained and packed, 3 per bag (~280 g), in Respire™ P369 film bags (OTR=300 cc/100 $in^2$/24 hrs, EPL Technologies, Inc., Philadelphia, Pa.). Samples were stored at 3° C. After the four or six days of storage, potatoes were cut in half lengthwise and boiled in water for 20 minutes. Halves were drained and cooled 10 minutes. Halves were mashed in a Hobart mixer (setting 2) for 30 seconds with 7 grams butter. 35 milliliters milk was added, and potatoes were further mashed for 4 minutes. Mixer was stopped after 2 and 3 minutes of mixing to scrape sides of bowl. 100 grams mashed potatoes was vigorously stirred in 1 liter of water for 1 minute and poured through a #8 sieve. This process was repeated two more times on material remaining on sieve. After the third washing, lumps collected by sieve were weighed and measured. A taste test exaluation was performed to subjectively evaluate texture of mashed potatoes.

TABLE 12

Discoloration of Potato Samples During Storage
(each number represents the mean subjective measurement of discoloration of three to four replicate samples)

| Treatment | Day 3 Mean Rating* | Day 5 Mean Rating |
| --- | --- | --- |
| 2-stage (final pH 7.8) | 2.0 | 3.0 |
| 3-stage (final pH 2.5) | 2.0 | 2.5 |
| 3-stage (final pH 3.2) | 1.0 | 2.0 |
| 3-stage (final pH 3.6) | 1.5 | 2.5 |
| 3-stage (final pH 4.3) | 1.5 | 1.5 |
| 3-stage (final pH 7.8) | 2.5 | 3.0 |

*Ratings were based on the overall acceptability of each sample as a whole. For example, if one of the three potatoes in a particular sample exhibited severe discoloration, the entire sample was rated as a 5.0, even if the other two potatoes in the sample exhibited no discoloration.
Rating scale:
1 = acceptable, little or no discoloration (like fresh)
2 = still acceptable, but not as good as fresh
3 = marginal
4 = marginal unacceptable
5 = unacceptable

TABLE 13

Post-Cooking Textural Quality of Potatoes Treated with Various 2-Stage and 3-Stage Processes and Stored Up To 6 Days at 3° C.

| | Percent of Lumps in Mash (by wt.) | Size of Lumps from Mash | Mouth-Feel of Lumps in Mash | Quality Rating of Mash * |
| --- | --- | --- | --- | --- |
| Day 4 | | | | |
| 2-Stage (final pH 7.8) | 14.7 | up to 5 mm | small, not raw-like | 1.5 |
| 3-Stage (final pH 2.5) | 29.4 | up to 10 mm | large, sl-mod raw-like | 4.0 |
| 3-Stage (final pH 3.2) | 19.9 | up to 10 mm | medium, sl. raw-like | 2.5 |
| 3-Stage (final pH 3.6) | 21.2 | up to 10 mm | large, sl-mod raw-like | 4.0 |
| 3-Stage (final pH 4.3) | 15.4 | up to 5 mm | small, not raw-like | 1.5 |
| 3-Stage (final pH 7.8) | 13.3 | up to 5 mm | v. small, not raw-like | 1.0 |
| Day 6 | | | | |
| 2-Stage (final pH 7.8) | 20.9 | up to 5 mm | small, not raw-like | 1.5 |
| 3-Stage (final pH 2.5) | 24.9 | up to 10 mm | large, sl-mod raw-like | 4.0 |
| 3-Stage (final pH 3.2) | 26.9 | up to 10 mm | medium, sl raw-like | 2.5 |
| 3-Stage (final pH 3.6) | 26.2 | up to 10 mm | medium, v sl raw-like | 2.0 |
| 3-Stage (final pH 4.3) | 15.3 | up to 5 mm | small, not raw-like | 1.5 |
| 3-Stage (final pH 7.8) | 10.7 | up to 5 mm | v small, not raw-like | 1.0 |

Abbreviations: v = very  sl = slight  mod = moderate
*Rating scale:
1 = acceptable, little or no discoloration (like fresh)
2 = still acceptable, but not as good as fresh
3 = marginal
4 = marginal-unacceptable
5 = unacceptable The first step, wherein the potatoes are dipped in a heated solution of organic acids, must be followed immediately by a dip to neutralize the potato surface in order to avoid induction of case hardening. The final dip must also have anti-browning properties. Sodium erythorbate, which is weakly basic (pH 7.8 in a 3% solution) and is a strong reducing agent, can be used in a two-stage process as both the neutralizing agent and the browning inhibitor. Unfortunately, a final dip of pH 7.8 is limited in its ability to inhibit browning by the fact that tyrosine, the predominant browning substrate in potatoes, is optimally oxidized by PPO at very nearly the same pH (pH 8.2 in potato homogenate).

It was hypothesized that a three-stage process would solve this problem by using the second stage as the neutralizing step, allowing the third stage to be adjusted to an acidic pH where the rate of PPO-catalyzed oxidation of tyrosine is slower than at pH 7.8. However, it was uncertain how acidic the final dip could be without inducing case hardening.

Potatoes treated with one of the three-stage treatments with a final dip pH of 2.5–4.3 appeared to discolor more slowly than those treated with a two-stage or three-stage process with a final pH of 7.8 (Table 12). There did not appear to be any differences between the three-stage treatments with a final dip pH of 2.5–4.3 with regard to discoloration.

Quantity and size of the lumps in the mashes from potatoes treated by three-stage processes with a final pH of 2.5–3.6 indicate that these treatments induced noticeable case hardening in comparison to the two-stage process (Table 13). Mashed potatoes made from potatoes treated by a three-stage process using a final dip pH of 4.3 had similar texture to that from potatoes treated with the two-stage process.

Interestingly, using the three-stage process with a final dip of 3% sodium erythorbate (pH 7.8) appeared to induce slightly less case hardening than the two-stage process, which uses the same final dip. This result confirms that sodium citrate, which is used as the neutralizing agent in the three-stage process, is a more effective neutralizing agent than sodium erythorbate. It also implies that rapid neutralization following the first stage is crucial to preventing induction of case hardening.

While it appears that a three-stage process, with a final dip pH of 4.3, may inhibit browning better than the current two-stage process, there could be other advantages as well. For example, bacterial growth at pH 4.3 is much slower than at pH 7.8.

Reduction of exposure time in the final dip could also reduce the rate of oxidation of the reducing agents in the final dip. This would help to reduce the cost of the process, since these reducing agents comprise the bulk of the process cost.

The foregoing detailed descriptions and examples have been given merely for purposes of illustration. Modifications and variations may be made therein without departing from the spirit and scope of the invention.

What is claimed is:

1. A process for inhibiting the enzymatic browning of raw, peeled, minimally processed potatoes, comprising:

exposing the potato surfaces to a first solution of one or more organic acids maintained at a temperature of about 45° C. to about 65° C.;

neutralizing the potato surface with a second solution that is weakly basic;

treating the potato surfaces with a third solution of reducing agents; and storing the potatoes at $\leq 10°$ C. in packaging means that provide a modified storage atmosphere.

2. The process of claim 1 wherein said first solution comprises a combination of about 2% citric acid and about 1% ascorbic acid at a total concentration of at least about 3% and at a pH of less than about 2.5.

3. The process of claim 1 wherein said first solution comprises a combination of about 2% citric acid and about 1% erythorbic acid at a total concentration of at least about 3% and at a pH of less than about 2.5.

4. The process of claim 1 wherein said first solution comprises citric acid at a concentration of at least about 2% and at a pH of less than about 2.5.

5. The process of claim 1 wherein said first solution comprises citric acid at a concentration of at least about 3% and at a pH of less than about 2.5.

6. The process of any one of claims 1 to 5 wherein said exposing step lasts from about 3 to about 10 minutes.

7. The process of any one of claims 1 to 5 and further comprising chelating agents added to said first solution of said exposing step.

8. The process of claim 1 wherein said second solution comprises the salt of an organic acid at a concentration of at least about 2%.

9. The process of claim 8 wherein said second solution comprises sodium citrate at a concentration of at least about 2%.

10. The process of claim 8 wherein said neutralizing step lasts for at least 2 minutes.

11. The process of claim 8 and further comprising chelating agents added to said second solution when said second solution is adjusted to a pH that is weakly basic.

12. The process of claim 1 wherein said third solution comprises a combination of reducing agents selected from the group consisting of a combination of erythorbic acid and sodium erythorbate, and a combination of sodium ascorbate and ascorbic acid, with each combination at a total concentration of at least about 2% and at a pH of no lower than 4.3.

13. The process of claim 12 wherein said treatment step lasts for at least 2 minutes.

14. A process for inhibiting the enzymatic browning of raw, peeled, minimally processed potatoes, comprising:

exposing the potato surface to a first solution of one or more organic acids maintained at a temperature of about 45° C. to about 65° C.;

treating the potato surface with a second solution of neutralizing and reducing agents; and storing the potatoes at $\leq 10°$ C. in packaging means that provide a modified storage atmosphere.

15. The process of claim 14 wherein said first solution comprises a combination of about 2% citric acid and about 1% ascorbic acid at a total concentration of at least about 3% and at a pH of less than about 2.5.

16. The process of claim 14 wherein said first solution comprises a combination of about 2% citric acid and about 1% erythorbic acid at a total concentration of at least about 3% and at a pH of less than about 2.5.

17. The process of claim 14 wherein said first solution comprises citric acid at a concentration of at least about 2% and at a pH of less than about 2.5.

18. The process of claim 14 wherein said first solution comprises citric acid at a concentration of at least about 3% and at a pH of less than about 2.5.

19. The process of any one of claims 14 to 18 wherein said exposing step lasts from about 3 to about 10 minutes.

20. The process of any one of claims 14 to 18 and further comprising chelating agents added to said first solution of said exposing step.

21. The process of claim 14 wherein said second solution comprises sodium erythorbate at a concentration of at least about 2% and at a pH of about 7.8.

22. The process of claim 21 wherein said treating step lasts for at least 2 minutes.

* * * * *

UNITED STATES PATENT AND TRADEMARK OFFICE
CERTIFICATE OF CORRECTION

PATENT NO. : 5,912,034
DATED : June 21, 1999
INVENTOR(S) : Stefan T. Martin et al.

It is certified that error appears in the above-identified patent and that said Letters Patent is hereby corrected as shown below:

In column 4, line 61, "only", should read --only--.

In column 5, line 55, "5minute", should read --5 minutes--.

In column 6, line 26, --**NaE = sodium erythorbate--, should be inserted.

In column 7, line 36, "Respirem", should read --Respire™--.

In column 7, line 37, "(OTR=300", should read --(OTR≅300--.

In column 8, line 3, "acceptable", should read --unacceptable--.

In column 8, line 61, "(OTR=300", should read --(OTR≅300--.

In column 9, line 60, "neutrlization", should read --Neutralization--.

In column 11, line 9, "Respires™", should read --Respire™--.

In column 11, line 10, "(OTR=300", should read --(OTR≅300--.

In column 12, line 64, "(OTR=300", should read --(OTR≅300--.

In column 13, line 3, "calorimeter", should read --colorimeter--.

In column 14, line 48, "(OTR=300", should read --(OTR≅300--.

In column 15, line 10, "8-9 min", should read --8-9 mm--.

In column 15, line 12, "Thick (18 1m)", should read --Thick (~1 m)--.

In column 16, line 55, "(OTR=300", should read --(OTR≅300--.

In column 17, line 25, "4=marginal unacceptable", should read --4=marginal-unacceptable".

UNITED STATES PATENT AND TRADEMARK OFFICE
CERTIFICATE OF CORRECTION

PATENT NO. : 5,912,034
DATED : June 15, 1999
INVENTOR(S) : Stefan T. Martin et al.

It is certified that error appears in the above-identified patent and that said Letters Patent is hereby corrected as shown below:

In column 19, line 20, "$\underset{=}{<}$", should read --$\leq$--.

In column 20, line 20, "$\underset{=}{<}$", should read --$\leq$--.

Signed and Sealed this

Twenty-fifth Day of January, 2000

Attest:

*Attesting Officer*

*Acting Commissioner of Patents and Trademarks*